United States Patent
Paz

(10) Patent No.: US 6,843,025 B2
(45) Date of Patent: Jan. 18, 2005

(54) CONSTRUCTION KIT

(75) Inventor: Haggai Paz, Zoran (IL)

(73) Assignee: Keter Plastic Ltd., Herzelyia (IL)

( * ) Notice: Subject to any disclaimer, the term of this patent is extended or adjusted under 35 U.S.C. 154(b) by 0 days.

(21) Appl. No.: 09/983,755

(22) Filed: Oct. 25, 2001

(65) Prior Publication Data

US 2003/0205005 A1 Nov. 6, 2003

(51) Int. Cl.[7] .............................................. E04H 1/00
(52) U.S. Cl. ....................... 52/79.1; 52/282.1; 52/582.1; 312/111
(58) Field of Search .................. 52/79.1, 79.9, 52/79.12, 90.1, 582.1, 578, 800.1, 800.11, 800.12, 800.13, 800.15, 800.16, 800.17, 800.18, 270, 271, 284, 281, 282.1; 312/108, 111, 265.1, 265.2, 265.3, 265.4

(56) References Cited

U.S. PATENT DOCUMENTS

| | | | | | |
|---|---|---|---|---|---|
| 3,349,533 A | * | 10/1967 | Gregoire | ..................... | 52/582.1 |
| 3,442,057 A | * | 5/1969 | Derr | .......................... | 52/79.1 |
| 3,646,716 A | * | 3/1972 | Jenner | ......................... | 52/403 |
| 3,661,434 A | * | 5/1972 | Alster | ......................... | 312/111 |
| 3,836,218 A | * | 9/1974 | Hallal | ......................... | 312/111 |
| 4,258,511 A | * | 3/1981 | Strain | .......................... | 52/79.1 |
| 4,279,455 A | * | 7/1981 | Santo | ........................... | 312/330 |
| 4,378,137 A | * | 3/1983 | Gibson et al. | ............ | 312/265.3 |
| 4,425,740 A | * | 1/1984 | Golden | ........................... | 52/81 |
| 5,398,468 A | * | 3/1995 | Erickson | ...................... | 52/282.3 |
| 5,477,594 A | * | 12/1995 | LePage | ........................ | 312/108 |
| 5,564,806 A | * | 10/1996 | Keisling et al. | ............. | 312/108 |
| 5,647,177 A | * | 7/1997 | Hwang | ........................... | 52/79.5 |
| 5,647,181 A | * | 7/1997 | Hunts | ......................... | 52/282.1 |
| 5,921,647 A | * | 7/1999 | Schneider et al. | ........... | 312/108 |
| 6,173,547 B1 | * | 1/2001 | Lipson | ........................ | 52/582.1 |
| 6,446,414 B1 | * | 9/2002 | Bullard et al. | .................. | 52/764 |
| 6,581,337 B1 | * | 6/2003 | Skov et al. | ................... | 52/79.5 |

FOREIGN PATENT DOCUMENTS

| | | | | | |
|---|---|---|---|---|---|
| EP | 178598 | * | 4/1986 | ................. | 312/108 |
| GB | 2156206 | * | 10/1985 | ................. | 312/108 |

* cited by examiner

Primary Examiner—Lanna Mai
Assistant Examiner—Hanh V. Tran
(74) Attorney, Agent, or Firm—Browdy and Neimark, P.L.L.C.

(57) ABSTRACT

A construction kit from which a do-it-yourself can erect a stable, strong structure whose predetermined geometry is maintained even when the structure is subjected to stresses. The kit includes a plurality of beams, a set of rectangular panels and two end frames. To assemble the structure, the beams are arranged to bridge the end frames and to snap-lock or screw onto the corners thereof to form a skeleton in which the beams are in parallel relation. The beams are profiled to form internal tracks for slidably receiving the panels, each panel being supported between a pair of adjacent beams to define a wall of the structure.

12 Claims, 3 Drawing Sheets

CONSTRUCTION KIT

BACKGROUND OF THE INVENTION

1. Field of the Invention

This invention relates generally to construction kits by means of which a do-it-yourself can erect a stable structure, and in particular to a kit of this type whose components can be assembled to create a walled structure whose predetermined geometry is maintained even when the structure is subjected to stresses.

2. Status of Prior Art

A conventional article of furniture such as a cabinet whose components are made of wood, plastic or composite materials, is usually assembled at a factory by means of screws, bolts or other fasteners, or by gluing the joints. Once the cabinet is finished and in condition to be sold, it must be crated and shipped to a retailer. When the retailer sells the cabinet, he must ship it in its finished state to his customer.

The cost of crating and shipping finished articles of furniture may in some instances approach its selling price. And the selling price cannot be low because it must cover the cost of assembling the article.

It is for these reasons that a large share of the furniture market has now been taken over by so-called "knock-down" furniture, such as those sold internationally by the IKEA furniture chain. What the consumer buys is not a finished article of furniture but a kit containing all of its components accompanied by instructions explaining to a do-it-yourself what must be done to assemble the components. Also included in the kit are screws and other fasteners necessary to join the components together as well as the tools for this purpose such as a wrench and screwdriver.

But a do-it-yourself is an amateur, not a professional craftsman, and when assembling a knock-down piece, the resultant structure may be somewhat misshapen and unstable.

One difficulty a do-it-yourself is likely to encounter is when erecting a structure having wall panels that must be mounted on frames. If the frames erected by the do-it-yourself are not quite rectangular, he will find it difficult to attach rectangular panels to these frames. Thus if a frame is provided with holes to receive screws for mounting a panel, and the panel is provided with matching holes, these panel holes will be out of registration with those in the frame should the frame not be perfectly rectangular.

A more troublesome aspect of an article of furniture assembled from a kit of parts is the so-called parallelogram effect. When a regular frame defined by parallel end beams attached to parallel side beams has a panel secured thereto is subjected to stresses, as are most articles of furniture, this may give rise to the parallelogram effect in which the end beams assume an acute angle with respect to the side beams.

To avoid this undesirable effect it is the common practice to reinforce the frame with guy wires extending diagonally in an X-formation from the four corners of the frame to resist its deformation. These guy wires are not only unsightly but they add to the cost of the do-it-yourself article and to some degree defeat its purpose which is to provide the consumer with a kit by which he can assemble an article that will be significantly less expensive than a pre-assembled, factory-made article.

SUMMARY OF THE INVENTION

In view of the foregoing, the main object of this invention is to provide a kit which makes it possible for atypical do-it-yourself to erect a structure that is stable and strong and which maintains a predetermined geometry even when the article is subjected to stresses. Thus if the structure to be erected is designed to have a parallelpiped geometry with a rectangular cross-section, then even when erected by an unskilled do-it-yourself it will not have a trapezoidal or other non-rectangular cross-section but will have the proper cross-section.

Among the significant advantages of the invention are the following:

A. The components which together make up the article of furniture to be assembled by a do-it-yourself are easily joined together so that it takes relatively little time to erect the structure, B. The structural beams included in the kit from which the skeleton of the structure is created are profiled to define internal tracks for accommodating the panels forming the walls of the structure, C. The structure is highly-resistant to the parallelogram effect and require no guy wires or other reinforcing expedients to prevent this undesirable effect, D. The do-it-yourself kit is relatively inexpensive and can be mass-produced at low cost.

Briefly stated, these objects are accomplished in a construction kit in accordance with the invention by means of which a do-it-yourselfer can quickly erect a stable and strong structure, such as a dog house, whose predetermined geometry is maintained even when the structure is heavily stressed. The kit includes a plurality of beams, two end frames and rectangular panels which when assembled create the desired structure.

To assemble the structure, the beams are arranged to bridge the end frames and to snap-locks or screw onto the corners thereof to form a skeleton in which the beams are in parallel relation. The beams are profiled to form internal tracks for slidably receiving the panels, each panel being supported between a pair of adjacent beams to create the walls of the structure. To disassemble the structure, it is only necessary to release the beam snap locks or remove the screws.

BRIEF DESCRIPTION OF THE DRAWINGS

For a better understanding of the invention as well as other objects and features thereof, reference is made to the annexed drawing wherein.

DETAILED DESCRIPTION OF THE INVENTION

Figure 1:
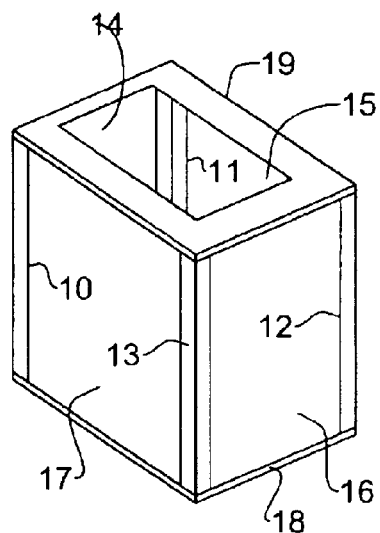
FIG. 1 is a perspective view of a structure erected by assembling the components of a kit in accordance with a first embodiment of the invention.
Figure 2:
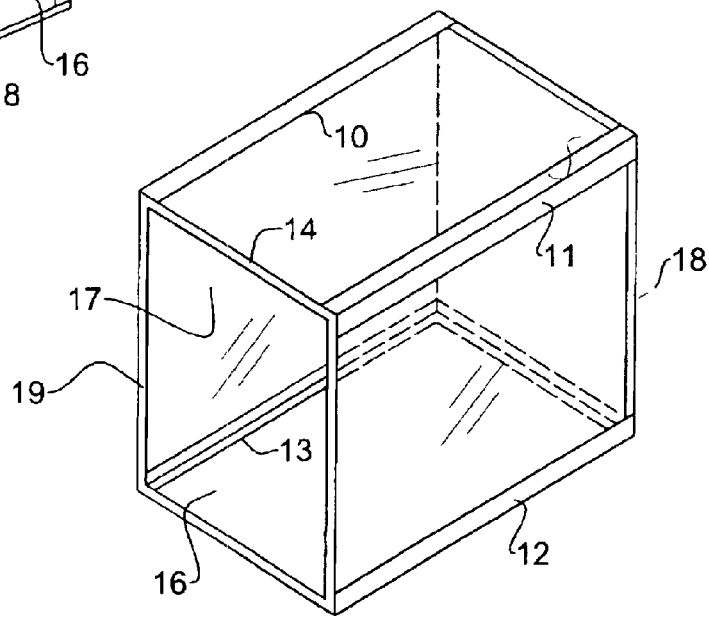
FIG. 2 shows the same structure with one end frame removed to expose the interior of the structure.
Figure 3:
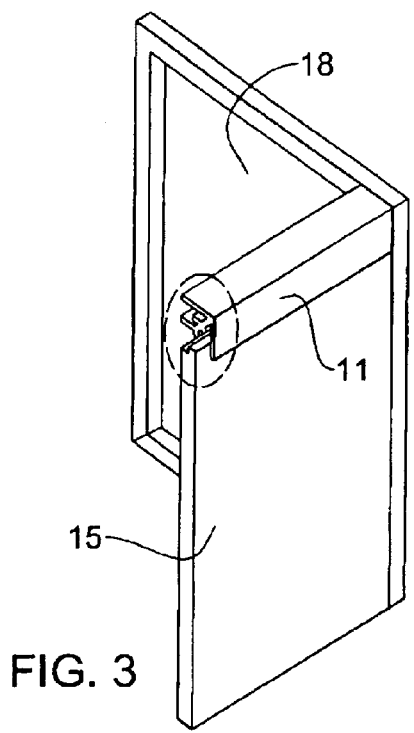
FIG. 3 illustrates one frame of the structure and a beam joined thereto which supports a wall panel at right angles to the frame.
Figure 4:
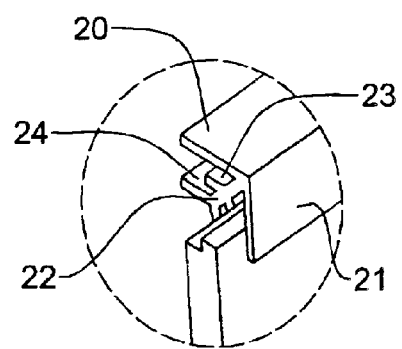
FIG. 4 is a magnification of a detail of the structure encircled in FIG. 3.
Figure 5:
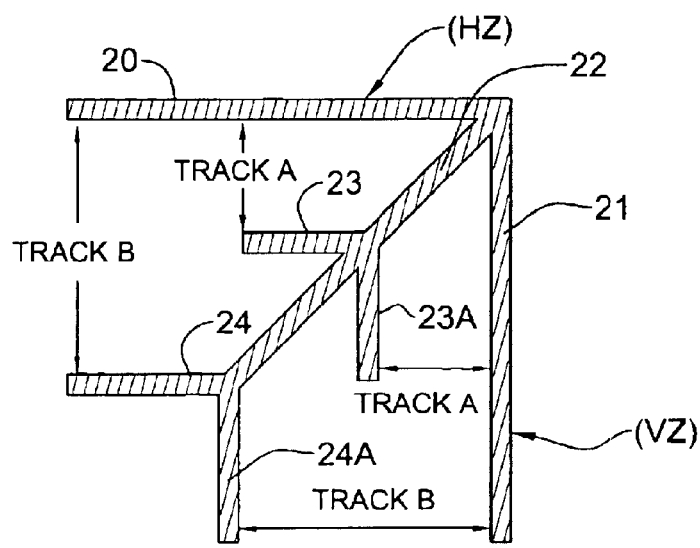
FIG. 5 is a transverse section taken through one of the beams.

First Embodiment:

Referring now to FIGS. 1 and 2, shown in these figures is a structure created by assembling the components of a construction kit in accordance with a preferred embodiment of the invention. The structure illustrated in these figures is a plastic container having a parallelpiped geometry, with a closed bottom wall and an open top wall. It is to be understood, however, that this simple structure is by way of example only, and that more complex structures can be erected by means of a kit having a greater number of components.

The components of the kit from which the container is assembled are the following:

(1) a set of four like structural beams 10, 11, 12 and 13,
(2) a set of four like rectangular panels 14, 15, 16 and 17 to form the walls of the structure,
(3) a closed rectangular end frame 18,
(4) an open rectangular end frame 19.

To assembly the structure, beams 10 to 13 are at their opposite ends snap-locked to the respective four corners of end frames 18 and 19 so as to bridge these frames and thereby create the skeleton of the structure in which the panels are trapped between adjacent parallel beams to form four side walls. All components of the kit are preferably molded of synthetic plastic material of high-strength, such as polypropylene or polyethylene. In practice, the beams may be formed of extruded aluminum.

Figure 6:
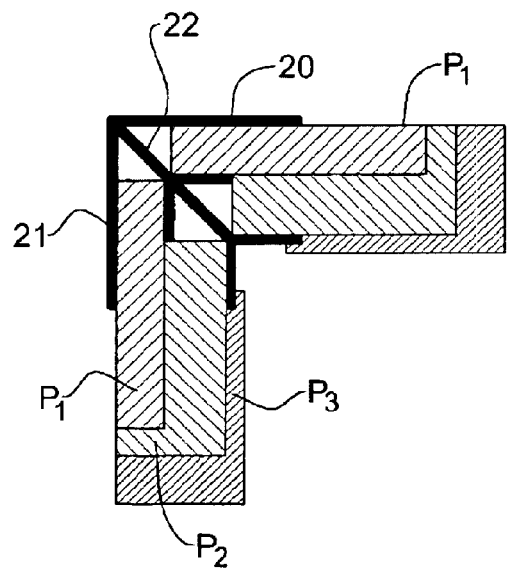
FIG. 6 shows the profiled beam when loaded with panels of different thicknesses.

Each beam, as shown in FIGS. 3 to 6, is profiled to define outer slats 20 and 21 at right angles to each other, and a diagonal slat 22 extending from the apex of the right angle to divide the beam into a horizontal zone HZ and a vertical zone VZ. Projecting from diagonal slat 22 at an intermediate position in horizontal zone HZ is a narrow ledge 23 which is parallel to outer slat 20. This ledge creates a narrow track A to accommodate a thin sidewall panel Pl. Projecting into horizontal zone HZ from the free end of diagonal slat 22 is a broad ledge 24 which is also parallel to outer slat 20 to create a wide track B. This track is dimensioned to accommodate a thicker panel P2 as shown in FIG. 6.

Should it be necessary to provide a very thick wall panel, such as panel P3 shown in FIG. 6, then in order for panel P3 to be accommodated, its edge must be stepped, the lowest step fitting into track A, the middle step into track B, and the third step abutting broad ledge 24.

Vertical zone VZ has corresponding ledges, namely a narrow ledge 23A and a broad ledge 24A to define a narrow track A and a wide track B. When the structure is being assembled, each of the panels 14, 15, 16 and 17 is slidably received in a pair of adjacent parallel beams, the panel going into the horizontal zone of these beams forming a horizontal wall, and the panel going into the vertical zone forming a vertical wall.

Since the beams are snap locked in the end frames, the panels are entrapped in the beams and act to stabilize the structure. To disassemble the structure, it is only necessary to release the snap locks and thereby separate the beams from the end frames and free the panels from the beams.

Figure 7:
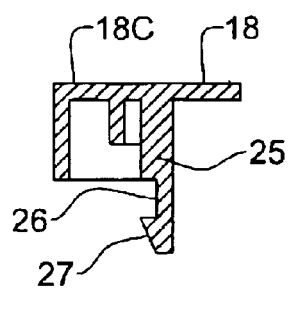
FIG. 7 illustrates the latch of a snap-lock at the corner of a frame included in the structure.
Figure 8:
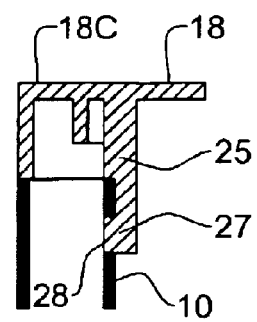
FIG. 8 shows how the beamlatches onto the frame.

FIGS. 7 and 8 illustrate a snap lock in a corner 18C of frame 18. This corner is provided with a flexible latch arm 25 having a notch 26 therein to create a tooth 27. When an end of beam 10 is pushed against corner 18C of frame 18, the tooth 27 in latch arm 25 then snaps into a slot 28 in the beam end to lock the beam to the corner. To release the lock it is only necessary by means of a button (not shown) to push the tooth 27 of the latch arm 25 out of the slot in the beam.

Figure 9:
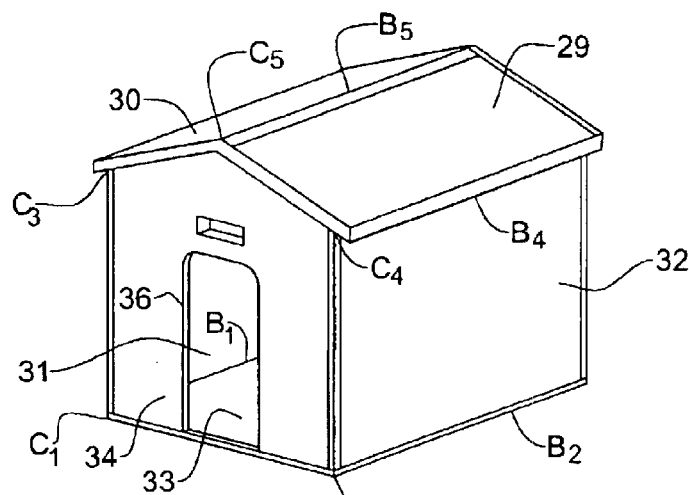
FIG. 9 illustrates a second embodiment of invention in which the structure is a dog house.
Figure 10:
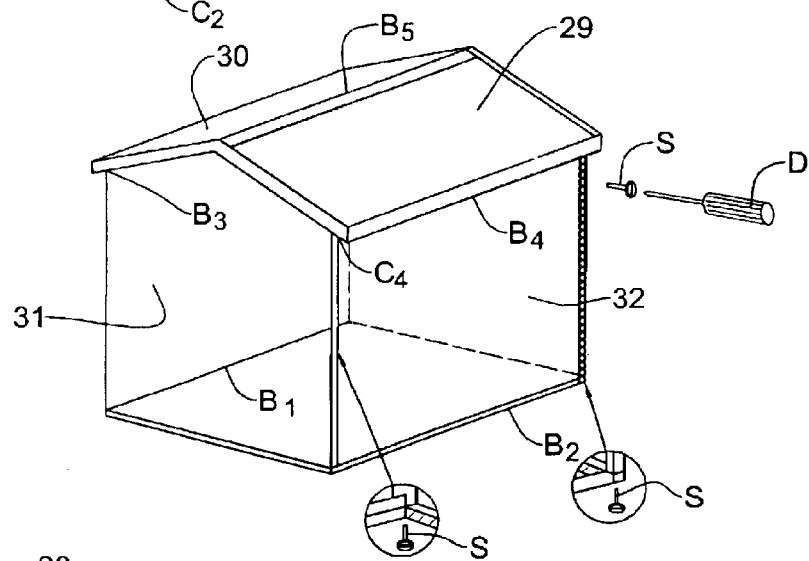
FIG. 10 shows the dog house structure without its front and rear end frames.
Figure 11:
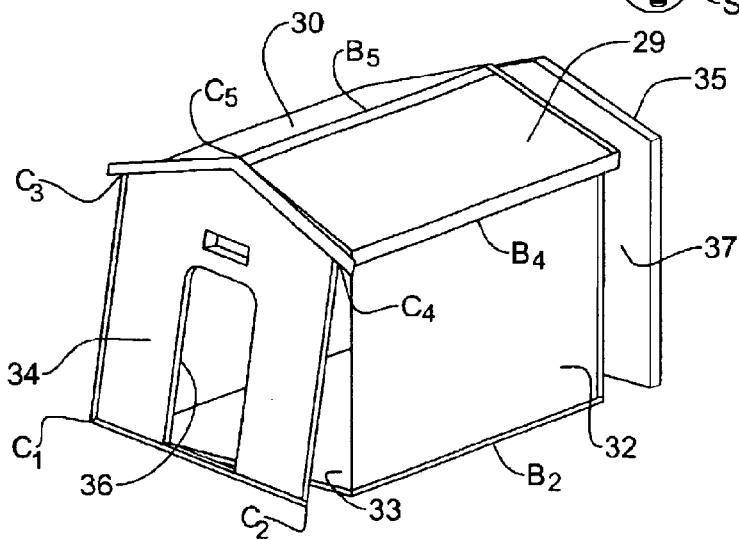
FIG. 11 shows the structure with its end frames detached therefrom.

Second Embodiment:

Illustrated in FIGS. 9, 10 and 11 is a dog house in accordance with the invention assembled by a do-it-yourselfer from a kit of the components. The kit also provides screws S necessary to assemble the structure and a screw driver D, as shown in FIG. 10. In practice, instead of screws, other types of fasteners or connectors may be used to connect the beams to corners of the end frames.

Included in the dog house structure is a gabled roof whose angled sides are formed by rectangular panels 29 and 30. Panels 31 and 32 define the vertical sidewalls of the structure, and panel 33 the horizontal floor.

Also provided are front and rear end frames 34 and 35 both having the same rectangular-triangular composite geometry imposed therein by the gable design. Front end frame 34 has mounted therein a wall panel having an arched entry 36 to admit the dog into the house. Rear end frame 35 has a blank wall panel 37 mounted therein to close the rear end of the house. All components of the house are molded of polypropylene or other high strength synthetic plastic. Each end frame has five corners C1 to C5, corners C1 to C4 being at the corners of the rectangular section of the frame corner C5 being at the apex of the triangular section.

Five horizontal beams B1 to B5 are provided which bridge the end frames and are attached thereto by screws S or other fasteners. Beam B1 bridges corners C1 of end frames 34 and 35. Beam B2 bridges corners C2, beam B3 bridges corners C3, beam B4 bridges corners C4, and beam B5 bridges corners C5 at the apex of the frames.

Beans B1 to B5 are parallel to each other and in combination with the end frames create the skeleton of the dog house structure. The beams are profiled in the manner previously disclosed in connection with the first embodiment to define internal tracks to slidably receive the panels 29, 30, 31, 32 and 33 which form the walls and floor of the dog house.

Thus floor panel 33 is trapped between beams B1 and B2 at the base of the structure, panel 32 is trapped between beams B2 and B4 to form one vertical side wall, panel 31 is trapped between beams B1 and B3 to form the other vertical side wall. Panel 29 is trapped between apex beam B5 and beam B4 to form one of the inclined roof walls, while panel 30 is trapped between beams B5 and B3 to form the other inclined roof wall.

The reason the structure is highly resistant to stresses and maintains its predetermined rectilinear geometry is that the panels are not fastened to the skeleton of the structure but are slidable in the beam tracks along a horizontal axis. When a stress force is applied to the skeleton which seeks to produce a parallelogram effect in which the end frames assume an acute angle with respect to the beams attached thereto, this force is transferred to the planar panels trapped between the beams. But the panels will not tolerate the parallelogram effect, for to do so it would be necessary to disrupt the internal structure of the panels. The panels are made of high strength, synthetic plastic material highly resistant to shear and compressive forces and acting therefore to stabilize the structure and to maintain its predetermined rectilinear geometry.

While there has been shown preferred embodiments of the invention, it is to be understood that many changes may be made therein without departing from its essential spirit.

What is claimed is:

1. A construction kit which makes it possible for a do-it-yourselfer to erect a strong and stable structure of predetermined geometry resistant to parallelogram effects; said kit comprising the following components:

A. first and second end frames provided with corners,

B. a plurality of beams adapted to bridge the end frames, each corner of the end frames being provided with a means to join the corner onto an end of a beam to create a structure skeleton in which the beams bridging the end frames are in parallel relation, said beams being formed as profiled members having L-shaped cross-sectional configuration defined by a vertical zone and a horizontal zone, wherein the vertical zone is divided from the horizontal zone by a diagonal slat;

C. a set of rectangular wall panels mountable on the beams, the vertical and horizontal zones of each beam being profiled to create at least one track therein, said track being suitable to slidably receive a panel within the track, the panel then being trappable between a pair of adjacent parallel beams and being confineable by the end frames to maintain the geometry of said structure when it is subjected to stresses the horizontal zone and the vertical zone are provided with outer slats, wherein the outer slats of the vertical zone define right angle with the outer slats of the horizontal zone; and ledges projecting from the diagonal slat into each zone, said ledges are parallel to respective outer slats to define a broad track and a narrow track, said broad and narrow tracks being suitable to accommodate panels of different thickness.

2. The kit as set forth in claim 1, in which said components are all molded of synthetic plastic material.

3. The kit as set forth in claim 2, in which the material is polypropylene.

4. The kit as set forth in claim 1, in which the first end frame is open and the second end frame is closed.

5. The kit as set forth in claim 1, in which there is a set of four beams to form together with the first and the second end frame a parallelpiped structure.

6. The kit as set forth in claim 5, in which there is a set of four wall panels.

7. The kit as set forth in claim 1, in which the means to join the corner onto the end of the bridging beam comprises a latching means formed with a latching arm which extends from the corner of an end frame and is provided with a tooth that is capable to snap into a slot made in an end of the bridging beam.

8. The kit as set forth in claim 1, in which one of said ledges projects from an intermediate location on the diagonal slat and is narrow in width, while another ledge, which projects from an end of the diagonal slat, is broad in width.

9. The kit as set forth in claim 1, said kit is suitable for erecting a dog house having a gabled roof formed by two slanted side panels, a pair of vertical sidewalls formed by another two upright panels, and a floor panel.

10. The kit as set forth in claim 9, in which the first end frame is provided at a front end of the dog house and the second end frame is provided at a rear end of the dog house.

11. The kit as set forth in claim 10, in which mounted in the first end frame is a panel having an entry therein to admit a dog, and mounted in the second end frame is a blank panel.

12. The kit as set forth in claim 9, in which the beams are joinable to the corners of the end frames by screws.

* * * * *